United States Patent
Sussmeier et al.

(10) Patent No.: US 7,229,025 B2
(45) Date of Patent: Jun. 12, 2007

(54) BARCODE WITH ENHANCED ADDITIONAL STORED DATA

(75) Inventors: John W. Sussmeier, Cold Spring, NY (US); Judith D. Auslander, Westport, CT (US); Donald G. MacKay, Roxbury, CT (US); Andrei Obrea, Seymour, CT (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 244 days.

(21) Appl. No.: 10/862,220

(22) Filed: Jun. 7, 2004

(65) Prior Publication Data

US 2005/0269416 A1 Dec. 8, 2005

(51) Int. Cl.
G06K 19/06 (2006.01)
G06K 7/10 (2006.01)
G06K 7/12 (2006.01)
G06K 7/14 (2006.01)
G06K 19/08 (2006.01)

(52) U.S. Cl. ............ 235/494; 235/491; 235/462.02; 235/462.04

(58) Field of Classification Search ............ 235/462.02, 235/462.04, 468, 469, 491, 101; 705/401, 705/405, 408
See application file for complete search history.

(56) References Cited

U.S. PATENT DOCUMENTS

| | | | |
|---|---|---|---|
| 3,569,676 A * | 3/1971 | Stites et al. .................. 235/494 |
| 4,864,618 A * | 9/1989 | Wright et al. .................. 380/51 |
| 5,153,418 A | 10/1992 | Batterman et al. |
| 5,170,044 A * | 12/1992 | Pastor .......................... 235/454 |
| 5,298,731 A * | 3/1994 | Ett .......................... 235/462.02 |
| 5,355,001 A * | 10/1994 | Fujimoto et al. ............ 235/494 |
| 5,357,094 A * | 10/1994 | Baldwin ................. 235/462.02 |
| 5,401,960 A * | 3/1995 | Fisun et al. .................. 235/468 |
| 5,563,401 A * | 10/1996 | Lemelson .................... 235/494 |
| 5,818,032 A * | 10/1998 | Sun et al. .................... 235/494 |
| 5,929,415 A * | 7/1999 | Berson .................. 235/462.01 |
| 6,032,861 A * | 3/2000 | Lemelson et al. ........... 235/494 |
| 6,070,805 A * | 6/2000 | Kaufman et al. ............ 235/494 |
| 6,102,289 A * | 8/2000 | Gabrielson ............. 235/462.01 |
| 6,296,189 B1 * | 10/2001 | Lawandy et al. ............ 235/491 |
| 6,325,420 B1 * | 12/2001 | Zhang et al. .................. 283/70 |
| 6,390,377 B1 * | 5/2002 | Dlugos .......................... 235/494 |
| 6,543,691 B1 * | 4/2003 | Lemelson et al. ........... 235/494 |
| 6,948,068 B2 * | 9/2005 | Lawandy et al. ...... 235/462.01 |
| 6,991,164 B2 * | 1/2006 | Lemelson et al. ..... 235/462.01 |
| 7,025,269 B2 * | 4/2006 | Marshall ................ 235/462.01 |
| 2002/0195586 A1 | 12/2002 | Auslander et al. |
| 2003/0005303 A1 | 1/2003 | Auslander et al. |
| 2003/0041774 A1 | 3/2003 | Auslander et al. |
| 2005/0161515 A1 * | 7/2005 | Lubow ....................... 235/494 |

* cited by examiner

*Primary Examiner*—Jared J. Fureman
(74) *Attorney, Agent, or Firm*—Ronald Reichman; Angelo N. Chaclas (57) ABSTRACT

A printed barcode including first basic barcode information stored in a first basic mode of printed data storage, and second additional enhanced barcode information stored in a second enhanced mode of printed data storage. The second information is printed, at least partially, as a component of the first information. The first information is adapted to be read by a basic barcode reader. The second information is adapted to be read by an enhanced barcode reader and cannot be read by the basic barcode reader.

17 Claims, 8 Drawing Sheets

BARCODE WITH ENHANCED ADDITIONAL STORED DATA

BACKGROUND OF THE INVENTION

1. Field of the Invention

The present invention relates to barcodes and, more particularly, to a barcode having a first basic stored information structure and a second enhanced stored information structure.

2. Description of the Prior Art

U.S. Pat. No. 5,153,418 discloses multiple resolution machine-readable symbols. Barcodes are used in many applications for the identification, tracking, and tracing of objects, letters, or packages. Some applications require only very basic information about an object (identity or destination), while other applications require detailed information about an object (e.g., postage paid, origin address, postage meter number, sender, addressee, destination address, weight, date, contents, batch number). Barcodes are also used extensively for the identification of objects for sale; for example, the Universal Product Code (UPC), and in many other applications. Such barcodes, in principle, could be expanded to include data about batch numbers, production dates, or expiration dates to aid in product recalls and rotation of product inventory.

Introduction of additional barcode information is hindered by several factors including real estate available on the object for barcoding; existing standardized barcode specification precluding expansion (e.g., Postnet is set as 12 digits); resolution of existing barcode readers and printers; expense and logistics to retrofit existing readers and printers; and need for barcoding schemes to conform to the least common denominator user.

Currently the solution for adding additional information in a barcode is to retain the old scheme barcodes (e.g., PostNet) for a period of time longer than desired. When the need becomes acute, then new barcode schemes (for instance PLANET and Universal Postal Union (UPU)/Remote Video Encoding (RVE) barcode supplementary barcodes) will be added to the same envelope. This approach is especially unsatisfactory, because it drives the adoption of independent non-integrated barcodes rather than driving the adoption of coordinated integrated barcoding solutions with a clear upward migration path. In the retail market place, the problems associated with expansion of barcodes and introduction of new barcode reader standards have precluded the use of these barcodes to aid in the Universal Product Code (UPC) tracking of expiration dates or product batch numbers.

Barcodes also carry heavy overhead costs. Because data read from barcodes is often affected by errors due to printing or poor handling, various error detection and correction solutions are applied to correct the read errors. Error detection mechanisms are generally based on the idea that a mathematical algorithm is applied to the data received (read) and, if the result indicates inconsistencies, then some of the data is used to recover the missing information. Current implementations have the useful data payload, error detection, and error correction transmitted (read) as part of a "homogeneous" process. Often, the three kinds of data are intermixed. When there is no loss of data (no read error), the error correction information never gets used. In such instances, the resources necessary to carry, read, and process that portion of data are "wasted". These resources are real estate on the label, scan time, processing time, storage for additional information, etc. The error correction and overhead information component of the total data stored in a barcode, depending on the level of redundancy required by the application, may exceed fifty (50%) percent.

SUMMARY OF THE INVENTION

This invention describes a method of encoding, printing, reading and decoding information using printed images, specifically bar code symbols. The information to be carried by the bar code image is divided in two parts. A first set of information elements is retrieved from the image by reading it and decoding it using a first set of methods. A second set of methods is used to retrieve the second set of information elements carried by the same bar code image. A first set of information elements is provided in a general legacy format of a conventional barcode. The second set of information elements is provided by constituent features in the bar elements of the barcode. This second set of information elements allows the introduction of additional channels of data for more advanced processing systems. However, the first set of information elements is encoded using methods that allow for backwards compatibility with existing or legacy barcode readers. Thus, a barcode of the present invention can be read by a legacy barcode reader to obtain the first set of information elements, and can be read by a more advanced reader to obtain the second set of information elements and/or the first set of information elements. The barcode can be the same size as a conventional barcode without taking up additional real estate on an article.

The present invention can include more than two sets of information element storage in a nested fashion.

The present invention can also be used with other methods of storing information in print, for example postal indicia, delivery point address barcodes, UPC.

The additional level(s) of information beyond the first set of information elements can include encoding by any suitable means including, for example, the use in barcode elements of different colors, different gray scale or halftone shades, different wavelength luminescent inks, different patterns or shapes, modulation lines, and sub-barcodes.

A successful initial read of the first set of information elements can also be used to eliminate the need for reading the additional second set of information elements, such as when the additional second set of information elements comprises error correction information.

DETAILED DESCRIPTION OF THE PREFERRED EMBODIMENTS

Figure 1:
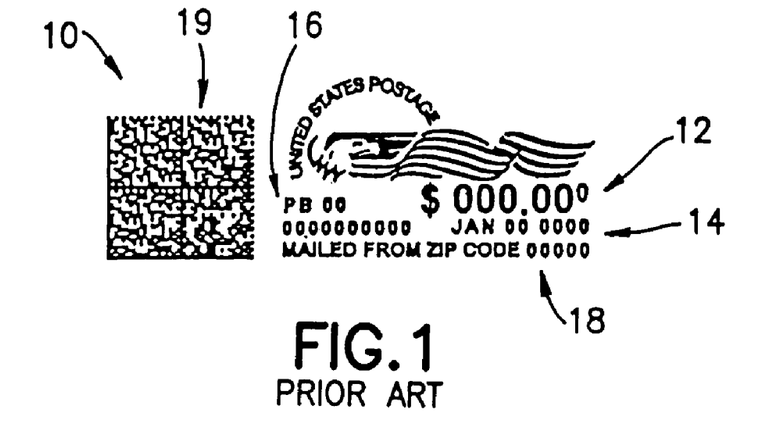
FIG. 1 is a plan view of a prior art conventional postage indicium.

Referring to FIG. 1, there is shown a plan view of a prior art conventional printed indicium 10. The indicium 10 includes a postage value section 12, a date section 14, a meter identification section 16, a ZIP code source identification section 18, and a two-dimensional barcode section 19. In this embodiment, the two-dimensional barcode section 19 comprises a DataMatrix barcode.

Figure 2:
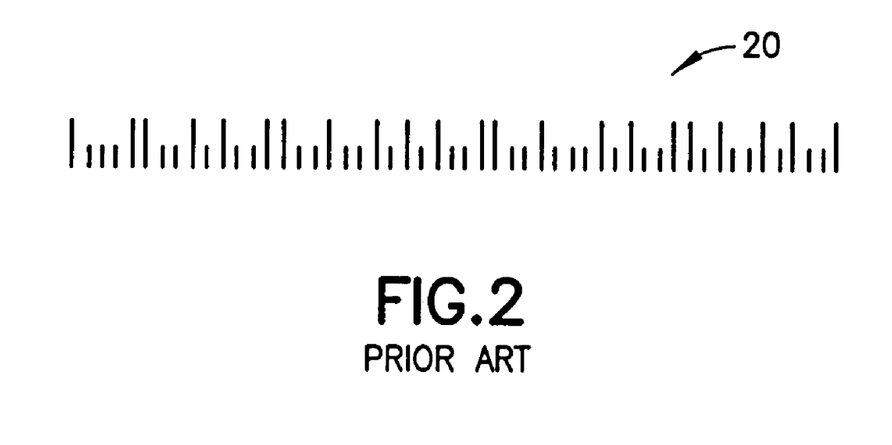
FIG. 2 is a plan view of a prior art conventional PostNet barcode.

FIG. 2 is a plan view of a prior art conventional PostNet barcode 20. The PostNet barcode is used by the United States Postal Service to represent a destination address for rapid reading in a system that automatically sorts mail. The PostNet code consists of evenly spaced bars of two different heights. Each character is represented by five bars, two tall and three short. The character set includes the digits zero through nine. The code begins and ends with a tall bar (frame bar) and may contain a 5-digit ZIP code, a 9-digit ZIP+4 code, or an 11-digit delivery point code. A check digit modulo (correction character) is inserted after the ZIP code and before the end frame bar. The check digit is calculated on the content of each ZIP code. The check digit is simply the number that, when added to the sum of the digits in the ZIP code, will produce whole multiples of 10.

Figure 3:
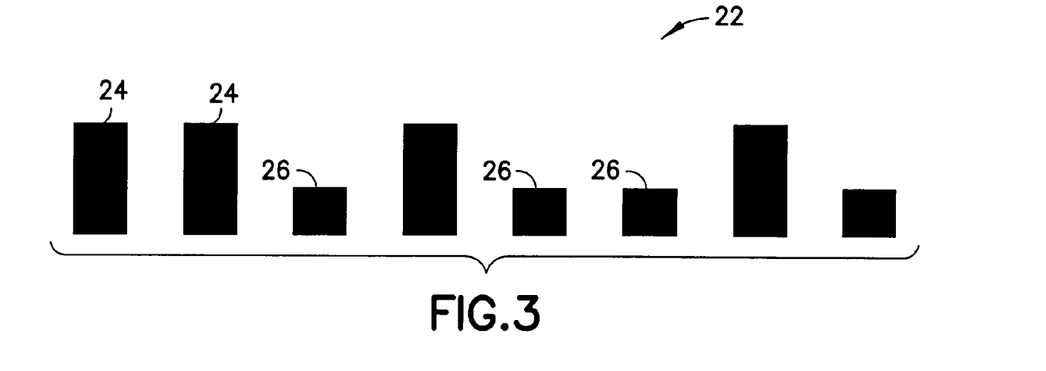
FIG. 3 is an enlarged partial view of a PostNet barcode.

FIG. 3 is an enlarged view of a portion of a PostNet barcode 22 which incorporates features of the present invention. The ink used to print the barcode 22 is preferably comprised of a color fluorescent ink which has a color under normal daylight, and which is fluorescent when subjected to an ultraviolet illumination source. The indicium 22 is preferably printed, at least partially, with a color luminescent ink, such as a fluorescent ink or a phosphorescent ink which is described in U.S. patent application Ser. No. 10/692,569 filed Oct. 24, 2003, which is hereby incorporated by reference in its entirety. Dark color fluorescent inks (i.e., dual luminescent) are known and are described in U.S. patent application publication Nos. U.S. 2002/0195586 A1, U.S. 2003/0005303 A1, and U.S. 2003/0041774 A1, which are hereby incorporated by reference in their entireties. The PostNet barcode 22 comprises tall bar elements or bars 24 and short bar elements or bars 26.

In the embodiment shown in FIG. 3, the bars 24, 26 are printed with dark color fluorescent ink. Under normal daylight, the barcode 22 is adapted to be read by a scanner. In particular, the barcode 22 is adapted to be read by a conventional or basic barcode reader. As used herein, the term "basic barcode reader" is intended to mean a conventional reader or scanner. The conventional barcode reader operates using visible light. The conventional reader is designed to read conventional digital (color/background) indicium barcodes including, for example, EAN-23, EAN-8, UPC-A, UPC-E, Code 11, 2 of 5 (interleaved, industrial or standard), Codabar, Plessey, MSI, PostNet, Code 39 (including LOGMARS), Code 93, Code 128, PDF417, DataMatrix, Maxicode, QR Code, Data Code, Code 49 and 16K.

The present invention can maintain a legacy barcode format (conventional barcode format) as the basic barcode format and introduces additional channels of data for more advanced processing systems. For instance, the PostNet barcode 22 would continue to be able to be read by a conventional PostNet reader as a black and white barcode with tall and short bars. An enhanced reader, however, would be able to use additional information within the barcode 22 to read additional data beyond the limited 12 digits encoded in the PostNet barcode. For example, the fluorescence of the ink at a predetermined frequency of an excitation source could signal what type of machine the barcode was printed from, or where the machine is located, or on what type of mail piece the barcode is located.

The first basic barcode information stored in a first basic mode of printed data storage comprises the barcode 22 being printed to be able to be read by a basic barcode reader. The second additional enhanced barcode information stored in a second enhanced mode of printed data storage comprises the printed barcode 22 which is able to be read by an enhanced reader, such as a fluorescent ink reader or a phosphorescent ink reader, for example.

The second information, preferably, is printed, at least partially, as a component of the first information. The second information cannot be read by a basic barcode reader. An enhanced reader would be able to read both the first basic barcode information and the second additional enhanced barcode information. Thus, a conventional barcode, such as barcode 19 or 20 shown in FIGS. 1 and 2, could be read by the enhanced reader. A basic barcode reader could also read the first basic barcode information in the barcode 22. Second enhanced stored information can be stored in the form of a substructure of the first basic information structure but need not be a substructure element.

These approaches allow a basic reader to capture the essential data needed to process a document while the additional level of encoded data can be extracted by a more expensive reader as necessary. Color can be used in a similar manner. A basic barcode could be read in black and white while the more in-depth data (additional level of data) could be encoded using color within the basic black and white barcode format structure. The color TV and stereo FM radio are good analogies. A color TV signal is backward compatible to black and white TV viewing, and a stereo FM radio broadcast can be heard in perfect clarity (although monophonic) on a mono FM radio. For example, one or more of the bar elements 24, 26 could be comprised of different colors, or portions within one or more of the bar elements 24, 26 could comprise different colors.

This concept could prove very powerful by maintaining compatibility with existing barcode readers (e.g., USPS PostNet) while also adding new features and details to documents for tracking. The USPS PLANET code was a step in this direction. The USPS used a complementary barcode symbology which a reprogrammed reader could read. The USPS used a complimentary barcode symbology which the same bar detection algorithms could read when the reader was retrofit with new decoding algorithms. However, the USPS no longer encodes data in the PostNet format. A PLANET code is not overlaid on a PostNet code; only one or the other can occupy a given space. The use of a much higher resolution (or color steps or gray scales rather than black/white bits) for the finer details is a way to increase the data storage density significantly.

Use of multiple wavelength inks can allow a completely different set of data to be read from the same barcode 22. For example, one or more of the bar elements 24, 26 could be printed with luminescent inks having different wavelengths. Portions within one or more of the bar elements 24, 26 could comprise different wavelength inks. Likewise, a UPC barcode would remain intact and readable by the legacy existing readers. Newer technology readers, however, could read additional data through the use of color, higher frequency patterns superimposed upon the UPC code, or high resolution patterns within the UPC bars.

This invention also can locate some or all of the error correction information in the "enhanced" portion of the barcode. The portion of the information located in the "enhanced" portion of the barcode could be read and used only if an error is detected using the information from the "base" barcode information. Overall, for the same error correction capabilities, there is a potential to achieve savings of label real estate, reading time, processing resources and storage by storing that data in a higher resolution area. It is conceivable that the "enhanced" information will be extracted from the image captured initially by using additional processing (at the higher data resolution) or a re-scan could be necessary, depending on the reader and processor designs.

Multiple (two or more) resolution barcodes using different colors, symbologies, or scales to encode data at different resolutions could be provided. The use of barcodes with multiple color scales, resolution scales, or symbologies allows information to be encoded for multiple purposes ("Bifocal Barcodes" or "Multi-focal Barcodes"). Large barcode elements may permit rapid read of basic data at a distance or using legacy existing readers, while higher resolution elements may be read upon closer inspection or using newer technology barcode readers.

Alternatively, data may be printed using multiple inks with different wavelength of reflection and absorption. In this case, different data may be read depending upon which wavelength is read. The invention offers the potential for a simple basic barcode (black and white) with an enhanced barcode (gray scale, color, and/or high resolution pattern overlay) for more demanding/higher-end applications within the same symbology. U.S. patent application Ser. No. 10/692,570 "Method And Apparatus For Halftone Printing With Multi-Signal Transmission Ink" filed Oct. 24, 2003, which is hereby incorporated by reference in its entirety, describes halftone printing and gray scale printing with multi-signal transmission ink.

For Bifocal (or Multi-Focal) Error Detection and Correction, there can be three implementations:

The large barcode elements carrying only error detection information in addition to the useful payload which will permit rapid read and verification of data integrity. In most cases, there are no errors, so the system will not need to read the "enhanced" portion of the barcode.

The large barcode elements carry error detection information and only some error correction information, in addition to the useful payload. When an error is detected, the system first uses the error correction data from the large barcode, and only if it is necessary will bring in the data from the "enhanced" portion of the barcode.

Error correction data can deliberately be placed away from the data it corrects. Thus, if the left bar is destroyed, the correction data could be embedded in the right bar which is less likely to be destroyed by the same event. This approach is best suited for very high-speed applications where processing resources are at a premium, or where maximizing the data in the low resolution barcode is desirable and error correction can be allocated to the high resolution portion of the barcode. The approach also improves barcode read reliability by reducing the amount of data required for basic operations.

In alternative embodiments, as described briefly above, the printing system could comprise more than the one ink supply, and the inks could be different kinds of inks. For example, a first one of the inks could be a non-luminescent ink, and a second one of the inks could be a color luminescent ink. Both inks could be used to form the barcode 22. In an alternative embodiment, the second ink could comprise an invisible luminescent ink. In another alternative embodiment, the two inks could comprise luminescent inks having different luminescent frequencies. The print head system could comprise at least two print heads. In an alternative embodiment, the print head system could comprise a single multi-ink print head adapted to pass by an area on the item at least two times—a first one of the times for printing a first ink and a second one of the times for printing a second ink.

Figure 4:
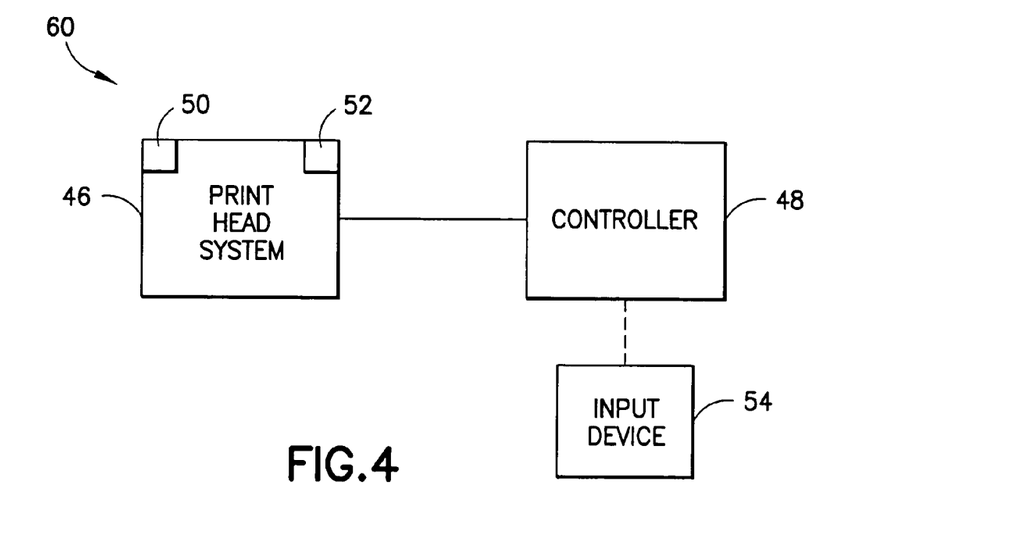
FIG. 4 is a diagrammatic view of a system for printing the composite indicium of the present invention.

Referring now also to FIG. 4, there is shown a diagrammatic view of a system 60 for printing the indicium 22 on an item, such as a mail piece for example. The system generally comprises a print head system 46 operably connected to a controller 48. The print head system 46 is adapted to print at least two different inks onto the item. The print head system comprises a first supply 50 of the first ink and a second supply 52 of the second different ink. The first ink comprises a non-fluorescent ink which has a first color under normal daylight, such as black, blue or red, for example. The second ink comprises a color fluorescent ink which has a second color under normal daylight which is substantially the same as the first color, and which is fluorescent when subjected to a fluorescent exciting radiation illumination source. In alternative embodiments, the print head system 46 could comprise more than the two inks supplies 50, 52. The print head system could comprise at least two print heads. In an alternative embodiment, the print head system could comprise a single print head.

The controller 48 is adapted for controlling application of the first and second inks by the print head system 46 on the item. In a preferred embodiment, the controller 48 is adapted to control the print head system 46 to print the first and second inks such that the patterns of the first and second inks are substantially indiscernible from each other when read by a basic reader. The indicium could comprise small squares of mixed green, blue, and black squares. All of these colors would appear to the basic reader as "black" squares. The controller can create a pattern by modulating between two different colors of small squares to encode enhanced data which will be contained within one or more PostNet bars of the PostNet barcode.

The second pattern formed by printing with the second ink can be printed, at least partially, on top of the first pattern formed by printing with the first ink. Alternatively, the second pattern could be printed inside an open area of the first pattern, or could be printed adjacent one another. In one type of embodiment, the controller can be adapted to control printing by the print head system 46 to proportionally print the first and second inks based upon relative sizes of the first and second patterns. In one type of embodiment, the system can comprise an input device 54 which is coupled to the controller 48. The controller can be adapted to change the second pattern based upon a signal or signals from the input device 54. The foregoing allows the indicium to be changed on demand by a user or automatically, and new codes or new hidden encoded information can be generated in real time.

Figure 5:
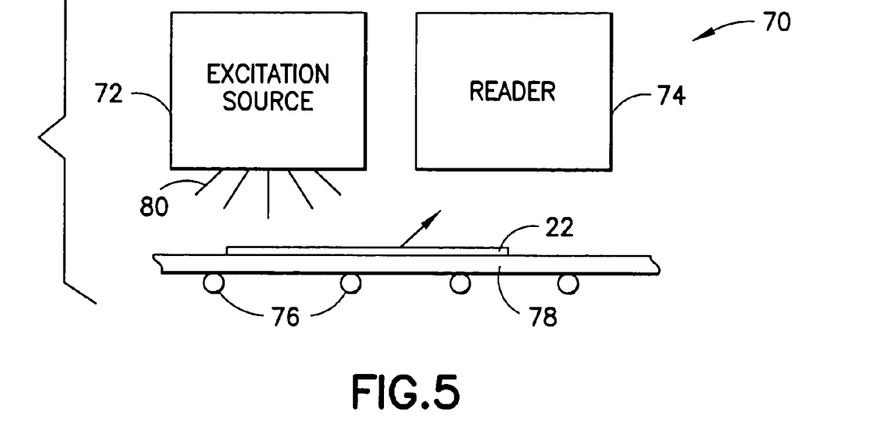
FIG. 5 is a diagrammatic view of a system for detecting a hidden fluorescent indicium in the composite indicium shown in FIG. 3.

Reading of the indicium of the second information in the multi-focal composite indicium 22 can be done visually by a user under a fluorescence excitation source, and/or can be done with an automated system. Referring now also to FIG. 5, an automated system 70 for reading the second information in the composite indicium 22 is shown. The automated system 70 comprises an excitation source 72, a reader or scanner 74, and a transport system 76 for transporting an item 78 having the multi-focal information indicium 22.

The transport system 76 could comprise any suitable type of document transport system, such as used in mail piece handling. In an alternative embodiment, the transport system 76 might not be provided, such as when the excitation source 72 and reader 74 are contained in a hand-held scanning device. The excitation source 72 is adapted to direct excitation radiation 80 towards the barcode 22 on the item 78. The excitation source 72 and type of excitation radiation 80 will be dependent on the color fluorescent ink that is used, generally ranging from ultraviolet to infrared. The reader 74 is adapted to read the fluorescent image and send a signal corresponding to the fluorescent image to another component, such as a processor for processing the scanned fluorescent image. In alternative embodiments, any suitable type of device or method for subjecting the composite indicium to a fluorescent exciting radiation source and for automatically detecting the fluorescent image and sending a signal to another component corresponding to the fluorescent image could be provided.

Figure 6:
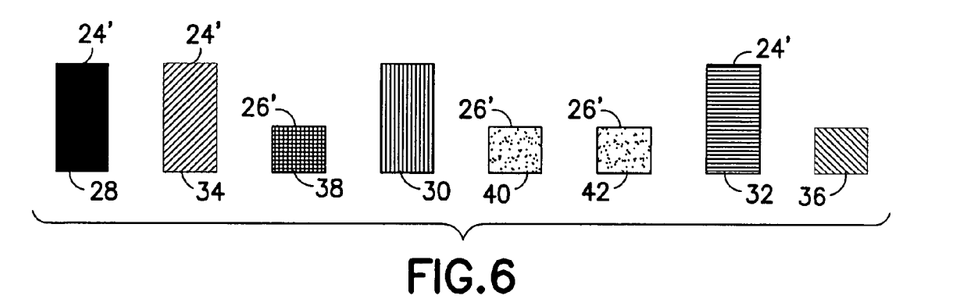
FIG. 6 is an enlarged partial view of a PostNet barcode as in FIG. 3 of an embodiment of the present invention.

An alternative approach is to encode a barcode at a higher level of resolution within the existing barcode. While FIG. 3 illustrates a fragment of a standard PostNet barcode format with additional enhanced information added, FIG. 6 illustrates an embodiment where pattern encoding of bar elements is used to store the second additional enhanced barcode information. Pattern encoding could be used in combination with the use of color or luminescent inks. In this embodiment, the tall and short bar elements 24' and 26' are comprised of a solid area 28, vertical lines 30, horizontal lines 32, diagonal lines 34 and 36, and crossing patterns 38, 40, 42. The bar elements 24', 26' can be read by a basic barcode reader or an enhanced barcode reader as a conventional "basic" barcode in a conventional lower resolution reading to extract the same data as conventional barcode 20 shown in FIG. 2. The barcode bars 24', 26' can also be read by the enhanced barcode reader (but not the basic barcode reader) to read the second additional enhanced barcode information by use of a higher resolution or type of reading to determine the patterns which comprise or form the individual bar elements 24', 26'.

Figure 7:
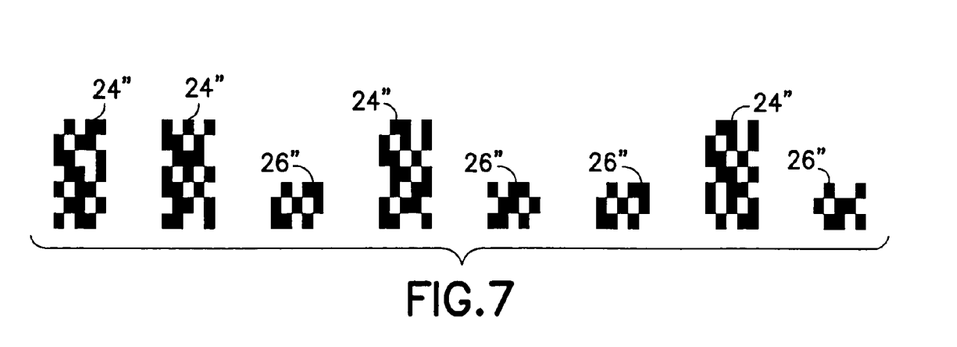
FIG. 7 is an enlarged partial view of a PostNet barcode as in FIG. 6 of an alternate embodiment of the present invention.

FIG. 7 illustrates an alternative embodiment of the same PostNet barcode fragment with the addition of new 2 of 5 barcode data within each bar. The tall bars 24" now encode an additional 7 lines of 2 of 5 data while the short bars now encode an additional 3 lines of 2 of 5 data. Since PostNet barcodes contain 2 tall and 3 short bars in each cluster of 5 bars, the new barcode is adding 23 new sets of data (digits) for each set of 5 bars. This equal 23 times more data than the original barcode while retaining downward compatibility for existing readers.

Clearly, any barcode symbology could be overlaid, whether glyph, DataMatrix, width modulated, or height modulated barcodes are used, so long as the original symbology can be read by the legacy systems. The new embedded barcodes can add a new dimension (increased data density) of data while maintaining backward compatibility. Backwards or downwards compatibility means that the present invention can be used without having to immediately replace all barcode printers and readers. Instead, the equipment can be phased in over time with normal equipment replacement, or in small increments.

Figure 8:
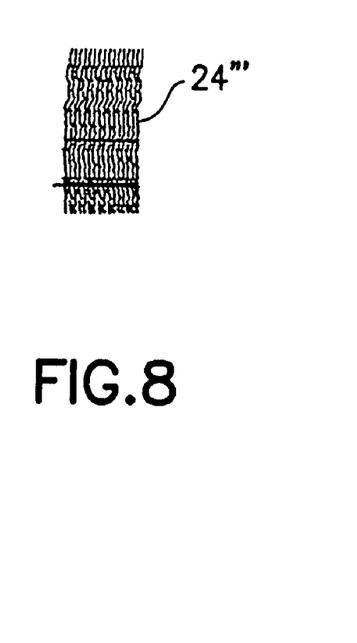
FIG. 8 is an enlarged partial view of a bar element of a PostNet barcode of another alternate embodiment of the present invention.

Another approach is the use of modulation. FIG. 8 illustrates a single tall bar 24''' from a PostNet barcode. The modulated bar element 24''' is comprised of a series of repeated lines each of which is tracing a pattern right and left as it progresses down the bar from top to bottom. Data encoded in this right-to-left motion could be read by a high resolution scanner while the original coarse PostNet barcode reader would only see the entire tall block. Strategies could even be developed to allow different data sets within each line so long as the lines covered enough overall area that the total data block "appeared to be solid" to the basic barcode reader. Such patterns could encode substantial amounts of data within a single PostNet bar.

Features of the present invention can comprise:
Use of color as the dual resolution parameter;
Use of gray scale as the dual resolution parameter;
Use of multiple wavelength inks which allow different data to be read at different wavelengths;
Use of multiple barcode types as the dual resolution parameter;
Use of high resolution substructures within an existing barcode element (for instance grain or modulation within an existing bar);
Use of a much higher resolution (or color steps rather than black/white bits) for the finer details as a way to increase the data storage density significantly;
Use of initial successful read to eliminate the reading of additional error correction code and associated processing steps.

The use of barcodes with multiple color scales, resolution scales, or symbologies allows information to be encoded for multiple purposes. Different readers can extract different data from the same overlaid barcode. A large scale barcode can encode basic information. A small scale barcode can encode details in equal space, such as complete document text, date, sender, routing, scanner time/date stamps at each step along the way, postage rate paid, meter number. Both combined allow a very basic reader to capture the essential data needed to process a document while the higher resolution detailed information allows details to be extracted by a more expensive reader as necessary. Color can be used in a similar manner. A basic barcode could be read in black and white while the more in depth data could be encoded using color (gray scales, or other symbologies) within the basic black and white barcode.

This concept could prove very powerful to maintain compatibility with existing barcode readers (for example, USPS PostNet) while also adding new features and details to documents for tracking.

We can add to the color other features that do not force real estate expansion, such as ink fluorescence or IR absorbing inks. In this way, there can be two overlaid barcodes with different information. Different gray scale values could be used to encode information. Three-dimensional codes may be used by utilizing combinations of dyes, i.e., IR absorbing (selectively) white color or black dye-based ink. The combination can be read independently, because they do not overlay. Linear increases in printer and reader resolutions yield squared increases in data storage (double resolution results in 4× data storage; triple increase in resolution results in 9× data storage), so the cost/benefit ratio is very positive.

This invention recognizes that an existing "low resolution barcode" read by existing equipment can be enhanced by "additional" or "high resolution barcodes". The "additional" or "high resolution barcode" uses a different additional method of reading (resolution, location, symbology, processing, etc) that may allow the original specification barcode within the combination to be read by legacy systems.

Bifocal barcodes or multi-focal barcodes can retain their ability to be read by existing basic barcode readers while adding data that can be read by enhanced readers if they are color/gray/pattern coded. A standard PostNet barcode encodes data in the height of the bars. Tall bars are a "1", while short bars are a "0". This same barcode fragment could contain significant additional data if the bars are color coded [or gray level or pattern coded]. Patterns are illustrated rather than colors to allow the invention disclosure to be circulated from black and white printers. If a palette of colors is selected which is dark enough to create bars that are seen by the existing barcode readers as "dark bars", then the barcodes will be backward/downward compatible. Since the existing barcode readers require a print/contrast ratio of 30%, a large selection of colors is available. If the new color barcode reader is designed to recognize 6 levels (the "Internet friendly color" hexadecimal steps of 0, 3, 6, 9, C, F) of magenta, yellow, cyan, then there are 216 (6×6×6) possible colors for a bar. Even if we drop out the low contrast cases (0, 0, 0 being the most extreme), there are still at least 64 possible colors (darkest being 4×4×4) and probably more. This means that each bar has increased the data content by 64 to 125 times over the original PostNet barcode while retaining downward compatibility.

As an example of the use of color, referring to FIG. 6, area 28 could comprise a first color, such as black, areas 34 and 36 could comprise a second color, such as red (but two different shades of red), areas 38, 40 and 42 could comprise a third color, such as green (but three different shades of green), area 30 could comprise a fourth color such as blue, and area 32 could comprise a fifth color, such as brown. Thus, shades of colors as well as colors, can be used to store the second additional enhanced barcode information. However, the first basic barcode information can still be read as a "perceived" conventional barcode, such as barcode 20 in FIG. 2. As another example, areas 28–42 could be printed with black ink (or black fluorescent ink) with different halftone or gray scale printing images. The areas 28–42 could read as a "perceived" conventional barcode, such as barcode 20 in FIG. 2, and can also be read with an enhanced or higher resolution reader to extract the higher level data encoded by the different halftone or gray scale printing images arrangement and/or values.

Bifocal or multi-focal error detection and correction enhance system productivity and allow data of interest (with error detection checksums or codes) to be stored in the low resolution barcode and the error correction (data reconstruction elements) to be stored in the additional or high resolution portion of the barcode. After the system captures the "low resolution" barcode or barcode information, it determines from the error detection data whether there is any reason to read additional "high resolution" data (it can be for error correction or for the needs of the application). Should the system decide that more data is needed, the "high resolution" portion of the barcode can be located, read and processed. Legacy barcode readers may read the basic legacy data while new higher resolution readers can read additional data.

Figure 9:
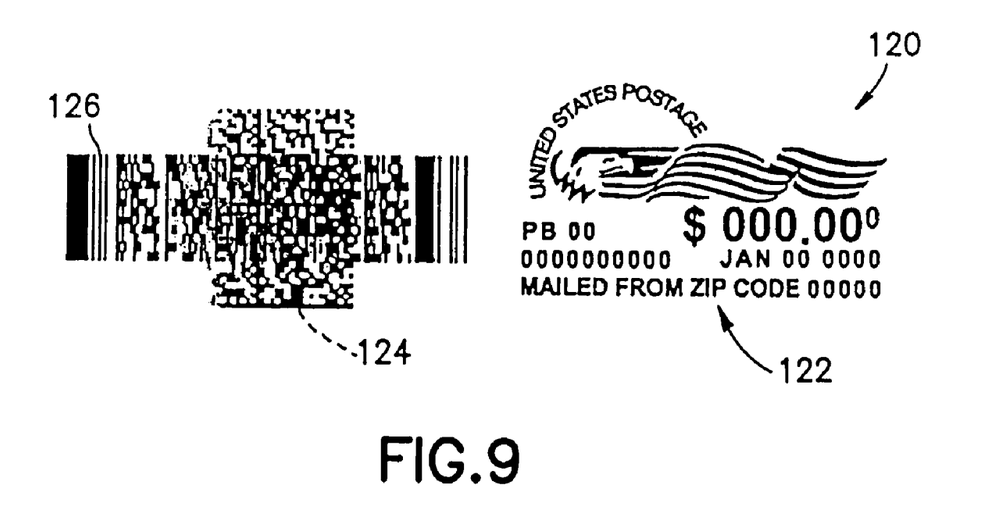
FIG. 9 is a plan view of a postage indicium with a first section and a second section incorporating features of the present invention.

Referring now to FIG. 9, another embodiment of the present invention is shown. FIG. 9 shows a postage indicium 120 with a first section 122 and a second section 124. The first section 122 is printed with a first ink, such as a non-fluorescent ink. The second section 124 is printed with a luminescent ink, such as a fluorescent ink. More specifically, the second ink comprises an ink which is substantially invisible or transparent in daylight or white light. In this embodiment, the second section 124 is printed over a barcode section 126 of the first section 122. The barcode section 126 is not substantially altered by the fact that the second section 124 is printed over the barcode section 126. Thus, the barcode section 126 can be read by a machine without interference from the fact that the second section 124 has been printed over the barcode section 126.

When the indicium 120 is subjected to a fluorescence excitation source, the second section 124 can fluoresce. The second section 124 can then be read by a machine or scanner. The second section 124 can be printed at a position relative to the barcode section 126 such that the barcode section 126 can be used as a reference for identifying a point for reading the second section 124. In an alternate embodiment, the barcode section 126 could be printed with a color fluorescent ink which is adapted to fluoresce at a different wavelength than the ink used to print the second section 124.

Figure 10:
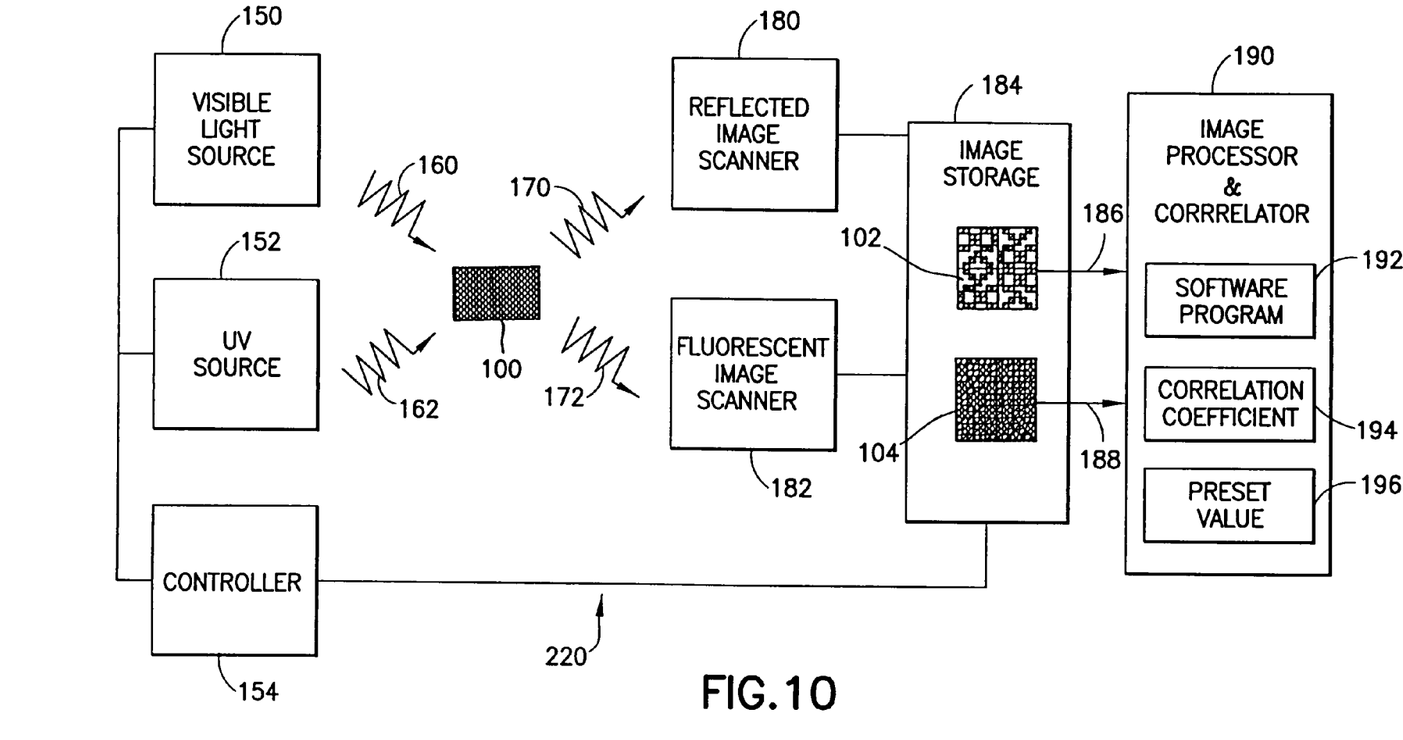
FIG. 10 is a schematic diagram of one type of system for reading a security marking made with features of the present invention.

FIG. 10 illustrates a system for validating a security marking 100, such as the two-dimensional DataMatrix barcode. As shown in FIG. 10, a visible light source 150 is used to provide illuminating light 160 on the security marking 100. With the reflected light 170 from the security marking 100, a reflected image scanner 180 can acquire the visible image 102. Similarly, an ultraviolet light source 152 is used to provide illuminating light 162 on the security marking 100. With the fluorescent emission 172 from the security marking 100, the fluorescent image scanner 182 can acquire the fluorescent image 104. Preferably, a controlling mechanism 154 is used to coordinate the illumination by the illuminating sources 150, 152 and the image acquisition by the image scanners 180, 182. The reflected image scanner 180 and the fluorescent image scanner 182 can acquire the respective images separately and sequentially. However, it is also possible to acquire the visible image 102 and the fluorescent image 104 simultaneously when appropriate filters and optical components are used to direct the reflected light 170 and the fluorescent emission 172 to the respective image scanners. It is preferred that the fluorescent image 104 and the visible image 102 are stored in an image storage 184, so that they can be processed. As shown, a signal or image data 186 indicative of the fluorescent image 104 and a signal or image data 188 indicative of the visible image 102 can be conveyed to an image processing and correlation device 190.

Because the fluorescent image 104 is a "negative" image of the visible image 102, if the data is compared, it may be preferable to process the image data 186, 188 before comparing the image data 186, 188. For example, a software program 192 can be used to compute a value 194 indicative of the correlation between the fluorescent image 104 and the visible image 102. The correlation value 194 can then be compared to a predetermined value 196 for determining whether the fluorescent image 104 and the visible image 102 are the results of the ink used to print the security marking 100. The security marking 100 can be assumed to be legally produced using the ink only if the correlation value 194 is equal or greater than the predetermined value 196, for example. It should be noted that, because the fluorescent emission from the ink can be limited to a certain wavelength range, it is possible to use a bandpass filter to allow only the fluorescent emission 172 in that wavelength range to reach the fluorescent image scanner 182. As such, the fluorescent emission from an illegal duplicate can be filtered out. While it is preferred to use an image scanner to obtain an image from the security marking, it is possible to use a digital camera or a video camera to obtain the image. It is also possible to use a film camera to obtain the image and a converting means to convert the film image to a digital image for processing.

Reading of the indicium can be done visually by a user under a fluorescence excitation source, and/or can be done with an automated or machine readable system. The excitation source and type of excitation radiation will be dependent on the color fluorescent ink that is used; generally ranging from ultraviolet to infrared. A reader can be adapted to read the fluorescent image and send a signal corresponding to the fluorescent image to another component, such as a processor for processing the scanned fluorescent image. In alternative embodiments, any suitable type of device or method for subjecting the indicium to a luminescing source and for automatically detecting the luminescing image and sending a signal to another component corresponding to the luminescing image could be provided. Although the present invention has been described with primary reference to a two-dimensional barcode section, features of the present invention could be used with a one-dimensional barcode section, or any other suitable type of printed indicium. Features of the present invention could also be used with transparent fluorescent ink, color phosphorescent ink, or any other type of multiple signal type of ink such as color magnetic or color electrical ink.

Figure 11:
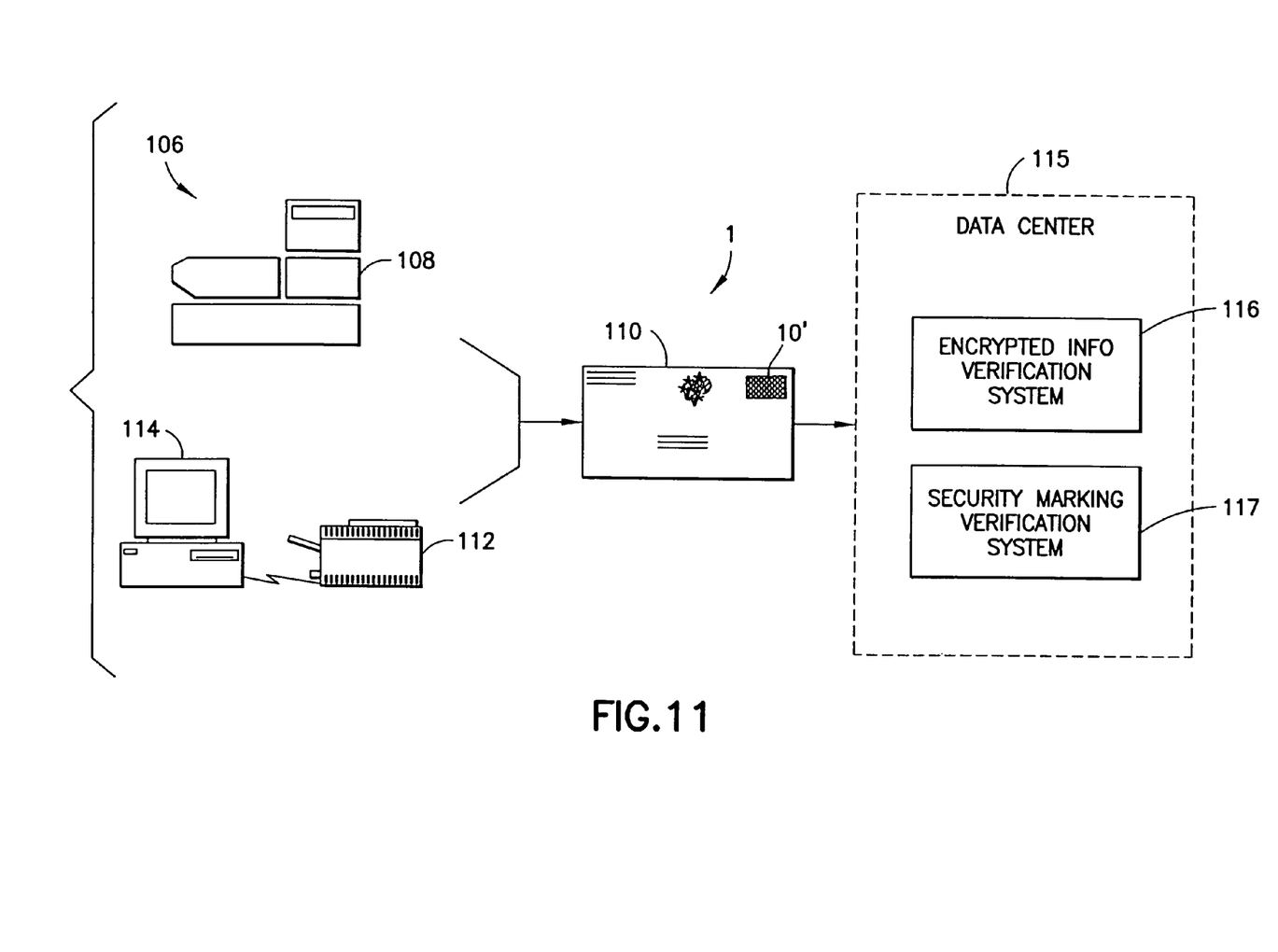
FIG. 11 is a schematic diagram of systems that can be used to print and read the barcode of FIG. 3 or 6 or 7 or 8 or 9 printed on, or attached to, a mail piece.

FIG. 11 illustrates an overall system for the authentication of an item using a security marking made from an ink of the present invention. For example, the system can be incorporated into an existing postage authentication system. As shown in FIG. 11, the system 1 can include a postage meter 106 having a print head 108 for printing a postage indicium and other mail or non-mail related information or images on the mail piece 110. Instead of the postage meter 106, a printer 112 can be connected to a computer 114 to print the information or images. When the mail piece is received by a data center 115, an encryption information verification system 116 can be used to validate the postage indicium 10' having the barcode from the encrypted information contained therein. The barcode may contain an indicium or other information. Additionally, a security marking verification system 117 can be used to verify a security marking from the fluorescent image and the visible image obtained therefrom. Preferably, the print head 108 is an inkjet print head and the printer 112 is an inkjet printer.

Fluorescence is an omni-directional phenomena, i.e., radiation scatters in all directions when measured against an absorbent dark background. The contrast of diffuse reflectance measures the difference in the percentage of reflected radiation of the incident light from a reflective background. By using a suitable type of ink, such as black fluorescent ink, and reading the image in fluorescence, the contrast achieved is much higher, and a much lower coverage area (area which printed ink must cover) is needed. The foregoing overcomes the problem of increased ink usage for achieving better contrast and surface coverage. Therefore, the cost of printing indicium, such as postage with relatively expensive fluorescent ink, can be reduced. The difference between contrast in fluorescence and contrast in reflectance allows this advantage to be obtained. The present invention can be used for all postage meters or printers using ink jet printing for printing postage indicium. The ink usage can be decreased by over fifty (50%) percent when the barcodes are intended to be read in fluorescence.

The image printed by a black fluorescent ink may be scanned in the visible region as well as in the IR region. The fluorescence can be measured on "front surface" measurements which, different than solution fluorescence, do not exhibit the "inner filter affect" characteristic to concentration quenching and "non uniform distribution of fluorescence" with higher concentrations on surface than in the bulk. A basic equation defining the relationship of fluorescence to concentration can be:

$$F = \emptyset lo(1 - e^{\epsilon bc})$$

Small F is the amount of fluorescence; Ø is the quantum efficiency; lo is the incident radiant power; ε is the molar absorptivity; b is the path length; and c is the molar concentration. For very dilute solutions or concentrations on paper, where K is a proportionality constant, the equation becomes:

$$F = K\emptyset lo \epsilon bc$$

Since fluorescence intensity is proportional with the concentration on the paper at low concentrations, and reaches a plateau at higher concentrations less than 100 percent of fill, it is possible to define various levels of fluorescence at increasing concentrations. Various levels of fluorescence can be defined as "gray levels of fluorescence" similar to gray level of colored and especially of black inks. The dependence of various concentrations of fluorescence on area coverage can be measured by measuring fluorescence intensity with a fluorometer. The fluorescence intensity measurements can be important to this concept, and an inexpensive and low-cost sensor can be developed for this purpose for adoption in printing devices or postage meters. The present invention can comprise use of high intensity fluorescent images combined with visual images (to identify the presence of the print) to improve print quality characteristics, such as contrast, fill area and modulation due to the advantages obtained by measuring the fluorescence. The print growth, which is higher in fluorescence, can compensate for the lower usage of ink that would otherwise be accompanied by regular black-and-white contrast.

The present invention has been described primarily in regard to a barcode primary structure having the first level of information. However, features of the present invention can be used with any suitable type of postage indicium. Features of the present invention can also be used with any other types of symbology and is not necessarily limited to postal indicium.

Figure 12:
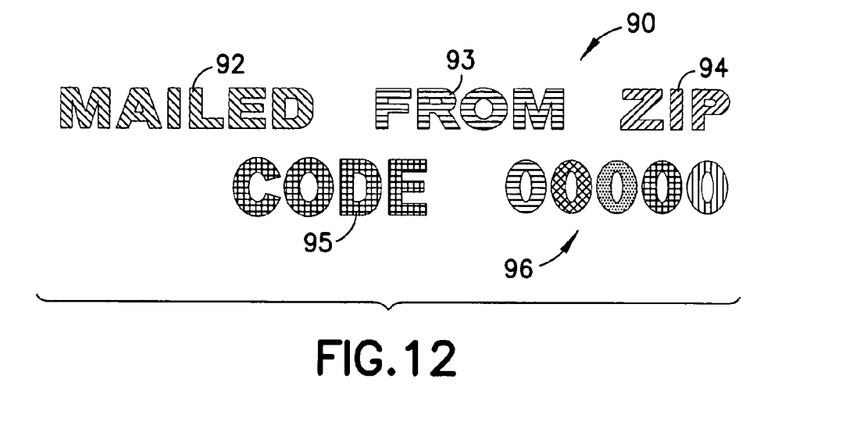
FIG. 12 is an enlarged plan view of a ZIP code source identification section of a printed postage indicium incorporating features of the present invention.

FIG. 12 shows one type of alternative embodiment. In this embodiment, a ZIP code source identification section 90 of a postage indicium is shown. This section would be printed by a postage meter similar to the section 18 shown in FIG. 1. The words of the section are comprised of the letters formed with patterns or lines of fill 92–95. The words can be read by a human observer similar to section 18. Additionally, the patterns or lines of fill 92-95 can also be read by a reader. Thus, the fill 92–95 can contain a sub-level of data information that is machine-readable. Similarly, each of the digits of the ZIP code 96 can have different lines or patterns of fill as shown to store additional information. The fill could alternatively comprise other encoding structures, such as the use of different colors, printing with gray scale or halftone, different wavelength luminescent inks, etc.

Figure 13:
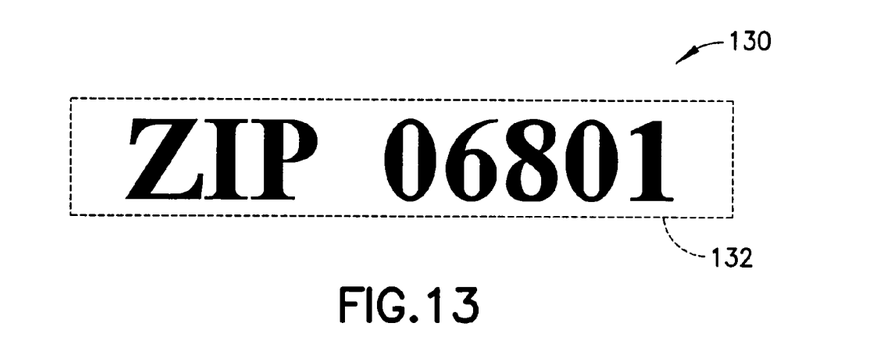
FIG. 13 is an area of a postage meter indicium showing a first information stored in a first basic mode of printed data storage.
Figure 14:
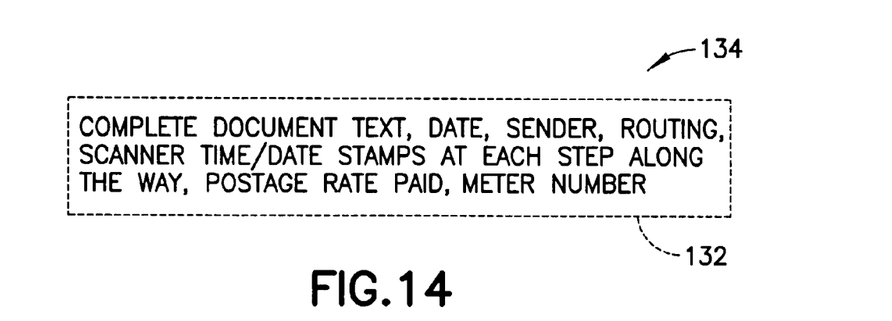
FIG. 14 is the same area of the postage meter indicium shown in FIG. 13 showing a second information stored in a second enhanced mode of printed data storage.

FIGS. 13 and 14 show a combination of features for producing a printed indicium comprising the first and second information. FIG. 13 shows a printed indicium 130 comprising a ZIP code that, for example, could be printed at section 18 shown in FIG. 1 in a postage meter printed indicium. FIG. 14 shows the printed indicium 130 under normal daylight conditions. The printed indicium 130 is printed in an area 132. Referring also to FIG. 14, the same area 132 comprises a second printed indicium 134. The second printed indicium 134 is printed with invisible phosphorescent ink on top of the first printed indicium 130. The second printed indicium 134 is substantially invisible during normal daylight viewing. However, when the area 132 is subjected to an excitation source, the second printed indicium 134 can be read.

In this embodiment, the second printed indicium 134 comprises much smaller printed text than the text of the first printed indicium 130. Thus, an enhanced or higher resolution scanner is needed to read the second printed indicium 134 than the first printed in addition 130. The second printed indicium 134 can provide additional information such as, for example, a date, a sender identification, a routing identification, scanner time/date stamps at each step along the way of a mail piece movement, postage rate paid, and meter number. The second printed indicium 134 can be printed by the original postage meter and/or by Postal Service equipment. The second printed indicium 134 need not be machine-readable. Instead, the second printed indicium could be human-readable but merely smaller type and located in the same space or area 132 as the first printed indicium 130.

Figure 15:
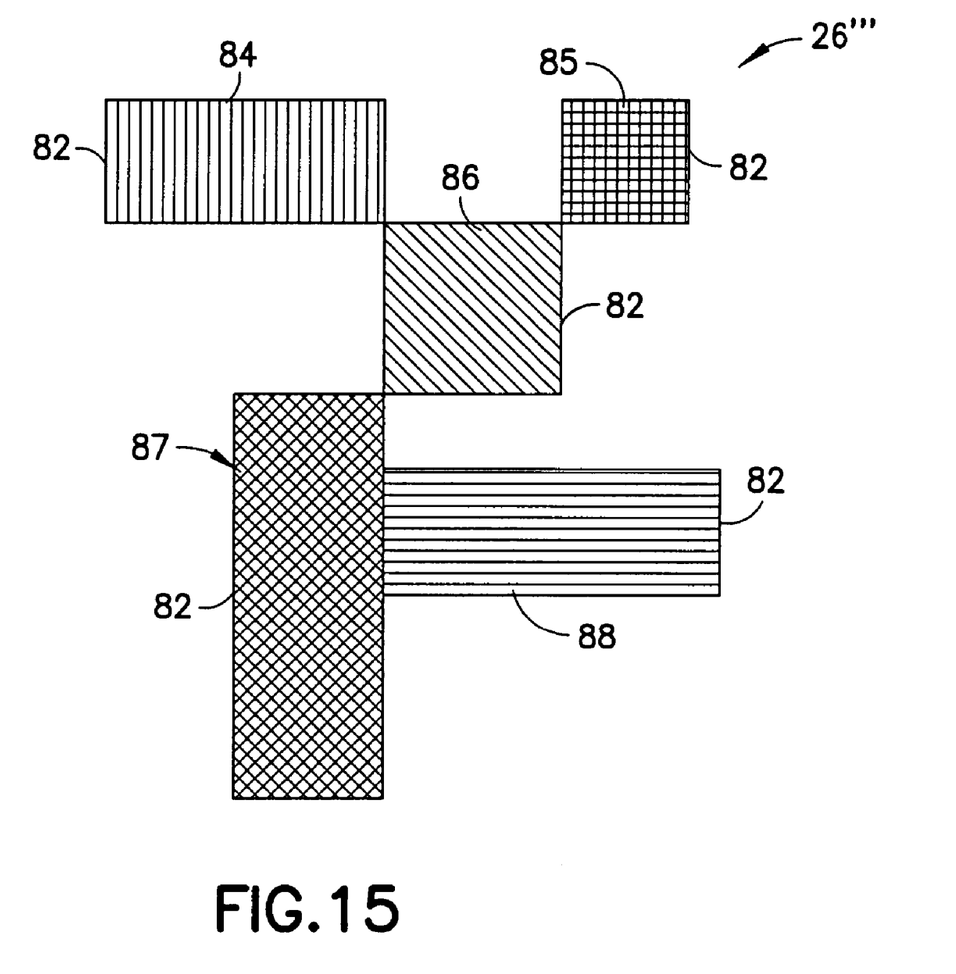
FIG. 15 is an enlarged plan view of an alternate embodiment of a bar element of a PostNet barcode having multiple levels of additional stored data.

FIG. 15 shows an alternative embodiment of the present invention. FIG. 15 shows one barcode element 26''' of a PostNet barcode. The PostNet barcode has a general structure similar to the barcode shown in FIG. 2. Thus, the barcode can be read by a legacy reader to obtain the first level of information; the standard PostNet barcode information. The barcode element 26''' comprises a first sub-barcode level of information similar to the barcode elements shown in FIG. 7. In this embodiment, the first sub-barcode structure comprises a 2 of 5 barcode structure with barcode elements 82. The barcode also comprises a third level of information; a second sub-barcode level of information similar to the first sub-barcode level of information storage shown in FIG. 6. Each barcode element 82 of the first sub-barcode level has lines or patterns 84-88. The barcode can be read at three different levels of resolution to obtain the first, second and third levels of encoded data. In an alternative embodiment, more than three levels could be provided. The third level could comprise any suitable encoding scheme including those mentioned above, such as use of color, wavelength or halftone encoding.

The present invention can comprise a postage meter indicium with nested data and overlaid data. The result of the nested data can comprise the original barcode reader seeing the basic bars as intact while the enhanced reader can distinguish additional data (e.g., because of colors or patterns). Consequently, additional data and patterns are constrained by the size and shape of the existing bars of the basic barcode shape. The additional data must be fit within the existing bar shape structure without significantly changing the outer perimeter size of the existing bar shape structure.

Excessive white in the bar may cause the bar not to read by a basic reader. Color selections that are "dark" make it easier for a basic reader to read the bar code (e.g., modulating pixels from black to green, as well as limited total white pixels). The result of the overlaid data (enhanced barcode independent of the basic information in the nested data) can be that the original barcode reader sees the basic barcode, and the new barcode is written in a form that is parallel/independent/invisible to the old reader. Consequently, if the enhanced barcode is invisible to the basic reader, then there is no restriction regarding location or data patterns.

The resolution of the new barcode data can be lower, the same, or higher than the basic barcode, such as illustrated by the following examples:

for a lower resolution, the new "nested" barcode could be a lower resolution by coloring the entire PostNet barcode GREEN for international mail and black for domestic mail;

for the same resolution, the new "nested" barcode could be the same resolution by coloring each single bar green or black to encode a second state of data;

for a higher resolution, the new "nested" barcode could be higher resolution as described above.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A symbol comprising:
(a) a first information set which is stored in a first mode of printed data storage with some or all error correction information removed from the first information set to increase information in the first information set; and
(b) second additional information set stored in a second sub-level mode of printed data storage, wherein the second information set has a structure which is represented at least partially using a substructure element of the first information set and the second additional information set also comprises error correction information that was removed from the first information set.

2. A symbol as in claim 1 wherein the symbol comprises a postage meter indicium.

3. A symbol as in claim 1 wherein the symbol comprises a bar code.

4. A symbol as in claim 1 wherein the first information set comprises a first basic barcode information, and wherein the second additional information set comprises a second additional enhanced barcode information.

5. A symbol as in claim 1 wherein the first information set is stored in a PostNet barcode format.

6. A symbol as in claim 1 wherein the first information set is stored in a DataMatrix two-dimensional barcode format.

7. A symbol as in claim 1 wherein the second sub-level mode comprises multi-color indicium.

8. A symbol as in claim 1 wherein the second sub-level mode comprises halftone indicium.

9. A symbol as in claim 1 wherein the second sub-level mode comprises gray scale indicium.

10. A symbol as in claim 1 wherein the first information set and second information set are comprised of different inks.

11. A symbol as in claim 10 wherein at least one of the different inks comprises a luminescent ink.

12. A symbol as in claim 10 wherein at least two of the different inks comprise luminescent inks which comprise different excitation wavelengths.

13. A symbol as in claim 1 wherein the first information set comprises a first barcode type, and the second information set comprises a second barcode type.

14. A symbol as in claim 13 wherein the first information set is stored in a PostNet barcode, and wherein the second additional information set is stored in a 2 of 5 barcode format in an element of the PostNet barcode.

15. A symbol as in claim 1 wherein the second additional information set comprises a high resolution substructure within an existing barcode element of the first information set.

16. A symbol as in claim 15 wherein the high-resolution substructure comprises different color components.

17. The symbol claimed in claim 1, wherein the error correction information in the second sub-level made is placed away from the information it corrects.

* * * * *